United States Patent [19]

Nagy et al.

[11] Patent Number: 6,020,855

[45] Date of Patent: Feb. 1, 2000

[54] TRANSPARENT VEHICLE WINDOW ANTENNA WITH CAPACITIVE CONNECTION APPARATUS

[75] Inventors: Louis Leonard Nagy; Douglas Courtney Martin, both of Warren; Michael Jerome Lewis, Southfield, all of Mich.

[73] Assignee: General Motors Corporation, Detroit, Mich.

[21] Appl. No.: 09/084,648

[22] Filed: May 26, 1998

[51] Int. Cl.[7] .................................................. H01Q 1/32
[52] U.S. Cl. ........................... 343/713; 343/711; 343/906
[58] Field of Search ...................... 343/713, 711, 343/712, 704, 767, 769

[56] References Cited

U.S. PATENT DOCUMENTS

| | | | |
|---|---|---|---|
| 5,670,966 | 9/1997 | Dishart et al. | 343/713 |
| 5,739,794 | 4/1998 | Nagy et al. | 343/713 |

*Primary Examiner*—Hoanganh Le
*Assistant Examiner*—James Clinger
*Attorney, Agent, or Firm*—George A. Grove; Robert M. Sigler

[57] ABSTRACT

A vehicle window antenna is a transparent, electrically conducting film disposed between the inner and outer glass sheets of a composite window glass. The antenna has a principal element spaced from the upper edge portion of the window aperture and an impedance matching element extending downward from the principal element to essentially cover the visible area of the window and form a slot transmission line with the remaining edge portion of the window aperture parasitically coupled to the principal element. The large area of the antenna provides a large capacitance producing high gain in a commercial AM band. An essentially transparent planar capacitive coupling member made of an electrically conducting material is affixed on an outer surface of the inner window glass. The capacitive coupling member defines a planar area of at least 100 square centimeters plane parallel with an equivalent planar area of the principal element of the antenna to capacitively couple therewith through one glass sheet and the interposed layer of the window glass. The large capacitive coupling area reduces the impedance at commercial FM wavelengths to an insignificant level to prevent the capacitive coupling member from adversely affecting the impedance matching of the impedance matching element of the antenna. The AM gain lost by capacitive coupling of the antenna is at least partially compensated by high AM gain due to the large area of the antenna. An electrically conducting terminal member extends vertically from the capacitive coupling member near the upper edge of the window aperture on an area of the window glass hidden by vehicle trim.

5 Claims, 3 Drawing Sheets

TRANSPARENT VEHICLE WINDOW ANTENNA WITH CAPACITIVE CONNECTION APPARATUS

TECHNICAL FIELD

The technical field of this invention is connection apparatus for vehicle window antennas.

BACKGROUND OF THE INVENTION

U.S. Pat. No. 5,528,314 discloses a vehicle window antenna comprising a film of transparent, electrically conductive material between inner and outer sheets of glass forming a vehicle window. The antenna has a principal element in an upper portion of the window connected to an impedance matching element extending downward from the principal element. The impedance matching element essentially covers the entire non-tinted or light tinted visible portion of the window and has a peripheral edge forming a slot transmission line with the car body which is parasitically coupled to the antenna. The antenna is designed for radio frequency reception in the commercial AM (300 meter) and FM (3 meter) broadcast bands. The principal element is tuned to a predetermined wavelength in the commercial FM band and its impedance is optimally matched by the slot transmission line to that of a feed cable in the same band. Its large total area provides especially good performance in the AM band.

The aforementioned patent shows several embodiments of apparatus for connection of the antenna to a feed cable leading to a radio frequency receiving apparatus. Each of these embodiments provides a strip of conducting material affixed directly to the antenna by an adhesive, the adhesive either being electrically conductive for a direct connection between the strip and the antenna or, if not electrically conductive, providing dielectric characteristics for a capacitive coupling therebetween. In one of these embodiments, the conducting strip has a portion affixed to the antenna within the window glass, between the inner and outer glass sheets, and another portion projecting out of the peripheral edge of the window glass for external connection to a coaxial cable. But this embodiment has encountered manufacturing problems; and production has settled on another embodiment, in which the window glass is first manufactured with the embedded antenna and then a portion of the inner glass sheet and binder layer is removed to expose the antenna for affixing the strip of conducting material. The latter embodiment, however, has its own manufacturing complications which tend to increase cost and limit production output.

SUMMARY OF THE INVENTION

The connecting apparatus of this invention provides capacitive coupling for the antenna described above. An essentially transparent planar capacitive coupling member made of an electrically conducting material is affixed on an outer surface of the inner window glass. The capacitive coupling member defines a planar area parallel with and opposing an equivalent planar area of the principal element of the antenna to capacitively couple therewith through the inner glass sheet and binder layer. The planar area is sufficiently large to provide no significant impedance to signals at the predetermined wavelength in the commercial FM band, preferably at least 100 square centimeters. An electrically conducting terminal member extends vertically from the capacitive coupling member in an area of the window hidden by vehicle trim for connection of a feed cable. Since the capacitive coupling member provides essentially no impedance at FM wavelengths, it does not adversely affect the impedance matching at FM wavelengths provided by the impedance matching element of the antenna. The capacitive coupling member is thus both visually and electrically transparent. Although the capacitive coupling of the antenna may produce a reduction in AM gain, AM gain of the antenna itself is so high, due to the capacitance of the large area of its electrically conducting film, that the AM gain with capacitive coupling is acceptable. The large area of the capacitive coupling member is permitted by the transparency of the antenna and capacitive coupling member and the location of the latter in an upper region of the window which can be dark tinted. In a preferred embodiment, the area of capacitive coupling, and thus the AM gain, can be maximized by providing a vertical extension of the antenna from the principal element plane parallel to a similar vertical extension of the capacitive coupling member to the electrically conducting terminal member; and the capacitive coupling between these vertical extensions prevents that of the capacitive coupling member from acting as a separately radiating antenna.

DESCRIPTION OF THE PREFERRED EMBODIMENT

Figure 1:
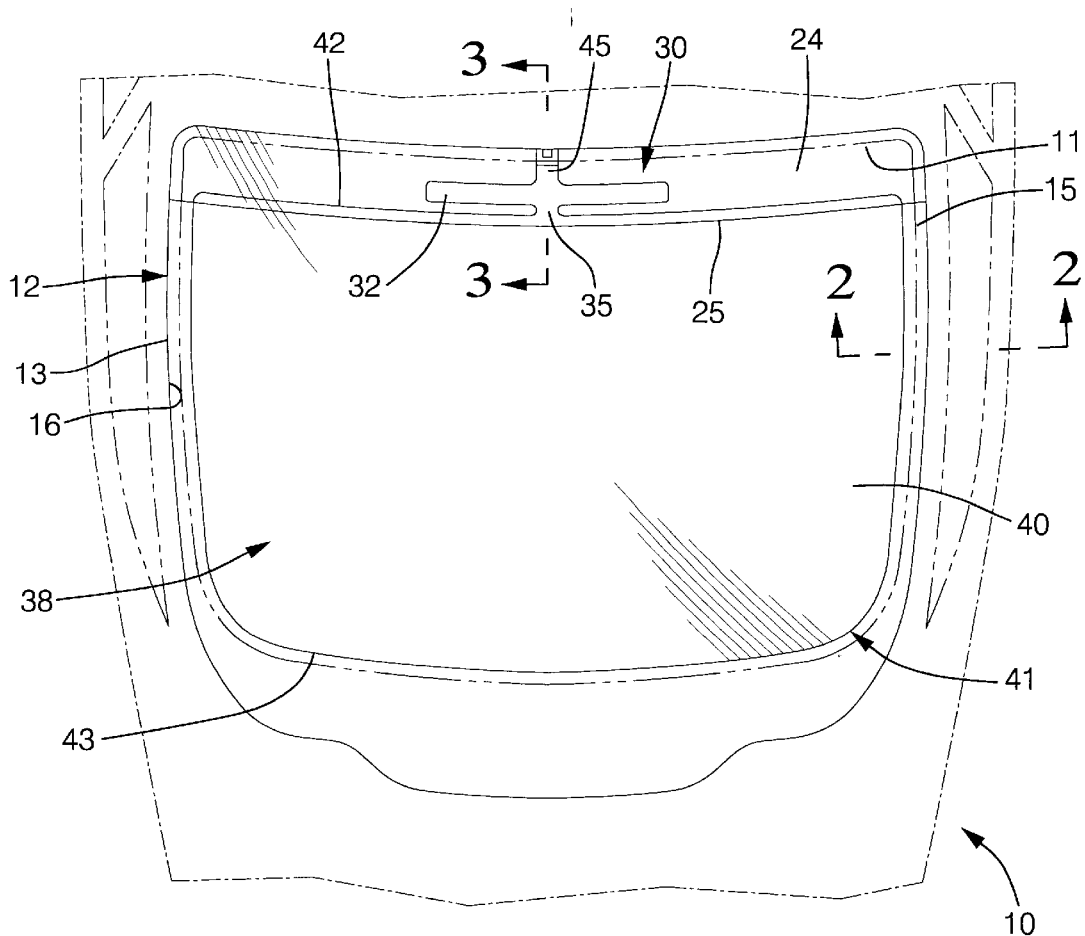
FIG. 1 shows a vehicle with a window antenna according to the invention.
Figure 2:
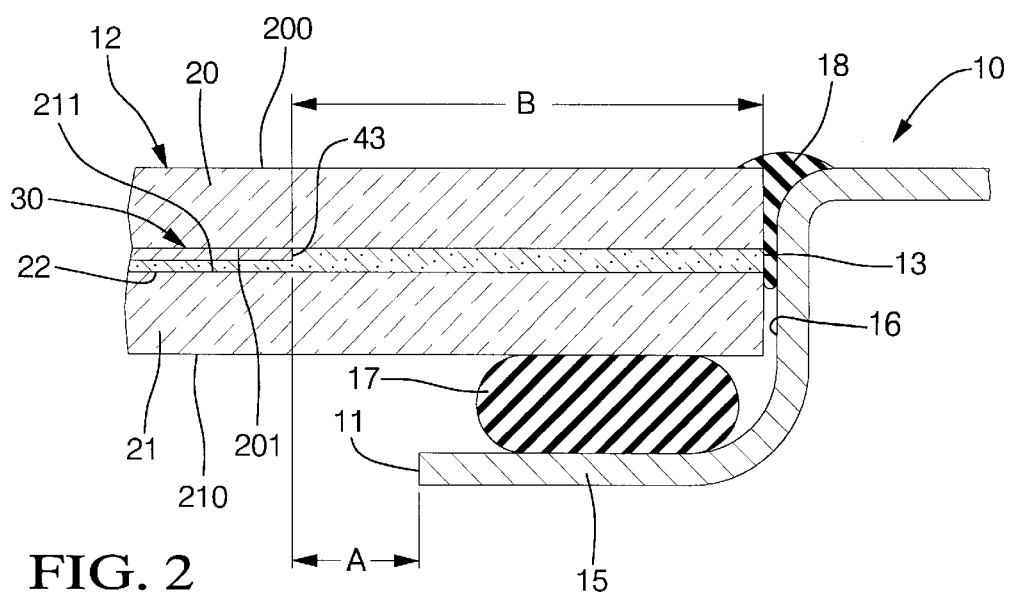
FIG. 2 shows a section view along lines 2—2 in FIG. 1.

FIG. 1 and 2 show a portion of a vehicle body 10 made of an electrically conducting metal such as steel or aluminum and having a window aperture defined by body window edge 11. A window glass 12 overlaps body window edge 11 around its periphery to provide a window—in this embodiment, a windshield—for vehicle body 10. The outer edge 13 of window glass 12 overlaps a depressed annular flange region 15 of body 10 defined between body window edge 11 and a retaining wall 16 which connects depressed flange 15 to the remainder of body 10 and retains window glass 12 flush with the remainder of body 10 in a predetermined position relative to body window edge 11. As seen in FIG. 2, an annular sealing member 17 is placed between window glass 12 and depressed annular flange region 15 of body 10; and an annular molding 18 bridges the outer gap between vehicle body 10 and window glass 12. Annular sealing member 17 and annular molding 18, which completely surround the window aperture, are of standard material and construction and are omitted from FIG. 1 to avoid unnecessary clutter.

As seen in FIG. 2, window glass 12 is a standard laminated vehicle windshield formed of an outer glass sheet 20, an inner glass sheet 21 and an interposed layer 22, preferably of a standard polyvinyl butyryl or similar thermoplastic material. Outer glass sheet 20 has an outer surface 200 on the outside of the vehicle and an inner surface 201 internal to window glass 12. Inner glass sheet 21 has an outer surface 210 on the inside of the vehicle and an inner surface 211 internal to window glass 12. Interposed layer 22 is between surfaces 201 and 211. Window glass 12 may be provided with a horizontal dark tinted region 24 across the top thereof, defined by its lower border 25 in FIG. 1. This dark tinted region, although commonly used in windshields for light and glare reduction, may be advantageously utilized in this invention to render the principal element and the connection apparatus of the antenna less visible.

An antenna 30 is provided in window glass 12 as a film applied to inner surface 201 of outer glass sheet 20 so as to be contained between glass sheet 20, on one side, and glass sheet and interposed layer 22, on the other side, as shown in exaggerated width in FIG. 2. The film of antenna 30 is essentially transparent to visible light, may be highly reflective of infrared radiation, and is electrically conducting, preferably with a sheet resistance of 4 ohms per square or less. An example of a suitable film is described in U.S. Pat. No. 4,898,789 to Finley, issued Feb. 6, 1990, which film comprises a first anti-reflective metal oxide layer such as oxide of zinc and tin, an infrared reflective metal layer such as silver, a primer layer containing titanium, a second metal oxide layer, another infrared reflective metal layer such as silver, an additional primer layer, a third anti-reflective metal oxide layer and, preferably, an exterior protective layer of titanium metal or titanium oxide. This film was designed for infrared reflection; but it is also electrically conducting and, with some adjustment of physical characteristics such as metallic concentrations or layer thicknesses, appears to be capable of the desired 4 ohm per square or less sheet resistance.

Antenna 30 is a planar antenna of substantially constant thickness and substance across its planar shape and may be described as comprising two basic elements. The first of these is a principal element 32 substantially parallel to and spaced from the horizontal upper portion of body window edge 11. Principal element 32 is essentially rectangular in this embodiment, although its horizontal edges may follow any slight curvature of the upper portion of body window edge 11 and its corners may be rounded for a more pleasing appearance. Principal element 32 is a tuned element having an effective horizontal length of an odd integer multiple of one quarter (¼) of the wavelength to which it is tuned, whereby it exhibits a zero reactive impedance at the tuned wavelength. In this embodiment, which is designed for commercial radio reception in the U.S.A., principal element 32 is tuned to a wavelength in the center of the commercial FM broadcasting band, such as three meters, and thus has an effective horizontal length of about 0.75 meters. It has been found, however, that the physical length of element 32 at resonance is somewhat shorter than a measured one quarter of the actual mid-band signal wavelength. It is believed that this is due to coupling with the vehicle body; and the length by which it is shorter will vary with the specific vehicle application. In one such vehicle, principal element 32 has been found to work well with an actual horizontal length of 60 cm and a vertical width of 50 mm. It is ideally spaced below the horizontal upper portion of body window edge 11 by a distance which provides maximum FM gain; but this distance may be compromised to gain other advantages for a particular vehicle design.

The second element of antenna 30 is an impedance matching element 38 which, in this embodiment, has a main portion 40 which covers substantially all or most of window glass 12 below dark-tinted region 24 and thus most or all of the main viewing area of window glass 12. Main portion 40 of impedance matching element 38 has a peripheral edge 41 with a horizontal upper portion 42 spaced at least 25 mm below the lower edge of principal element 32 so as to minimize transmission coupling effects therebetween and is connected thereto for electric current flow by a narrow vertical portion 35. Upper portion 42 of peripheral edge 41 is preferably within dark tinted region 24 of window glass 12 along its entire length from close to one side to close to the other side of window glass 12, so that dark tinted region 24 overlaps the main portion 40 of impedance matching element 38. This is desirable for the sake of vehicle appearance, so that the non-tinted or lightly tinted area of window glass 12 below dark tinted region 24 will have a uniform appearance. However, this is a factor which may produce the compromise in the vertical position of principal element 32 as described above, due to design or governmental limits in the vertical extent of dark tinted region 24 below window edge 11. In one specific design, an ideal spacing of about 11.5 cm from principal element 32 to the upper portion of body window edge 11 is compromised to a closer 9 cm spacing with a resulting slight decrease in FM gain.

The remainder 43 of peripheral edge 41 of impedance matching element 38 is spaced a distance "A", as seen in FIG. 2, from body window edge 11 so as to provide, in combination therewith, a planar slot transmission line which is parasitically coupled to principal element 32. To this end, gap width "A" is preferably within the range 10–25 mm. The length of the slot is substantially an integer multiple of one half of the wavelength to which principal element 30 is tuned, so that each end of the slot transmission line, at the junctions of upper portion 42 and remainder 43 of peripheral edge 41, appears as an electrical open circuit. In this embodiment, with a large windshield, this length is one full wavelength, which for the middle of the commercial FM broadcast band, is approximately 3 meters. Impedance matching element 38 is used to adjust the real component of the antenna's impedance to match the characteristic impedance, typically 125 ohms, of the coaxial cable used to feed the antenna; and this is accomplished by the proper choice, within the range 10–25 mm, for the width "A" of the gap between the remainder 43 of peripheral edge 41 of impedance matching element 38 and the adjacent portion of body window edge 11. For appearance, and to maximize the infrared reflecting efficiency of the windshield, a dark, opaque, painted band, not shown but of width "B" as indicated in FIG. 2, may be provided around the sides and bottom of window glass 12 to substantially or completely cover the area outward from the remainder 43 of peripheral edge 41 of impedance matching element 38 to the outer edge 13 of window 12. This band can be broken into dots of decreasing size toward its inner boundary for a fadeout effect as is known in the industry. If such a band is provided, together with the dark tinted region at the top of the windshield, substantially the entire non-tinted or light tinted viewing area of window glass 12 can be uniformly provided with the infrared reflecting film of antenna 30.

Impedance matching element 38, in addition to providing infrared radiation reflection over substantially all the lighter tinted portion of the windshield and impedance matching for greater gain at commercial FM wavelengths, provides an additional benefit at commercial AM wavelengths [150–600 meters]. At such longer wavelengths, antenna 30 is not a resonant antenna but is substantially a capacitive antenna; and the large area of impedance matching element 38 provides a substantial boost in gain for antenna 30, as compared with similar planar and other antennas of the prior art. In fact, the boost in AM gain is so great that some of it can be sacrificed, if desired, in fine tuning antenna performance for other design considerations, while still yielding good AM performance. This characteristic of antenna 30 makes it a perfect match for the connection apparatus to be described.

Figure 3:
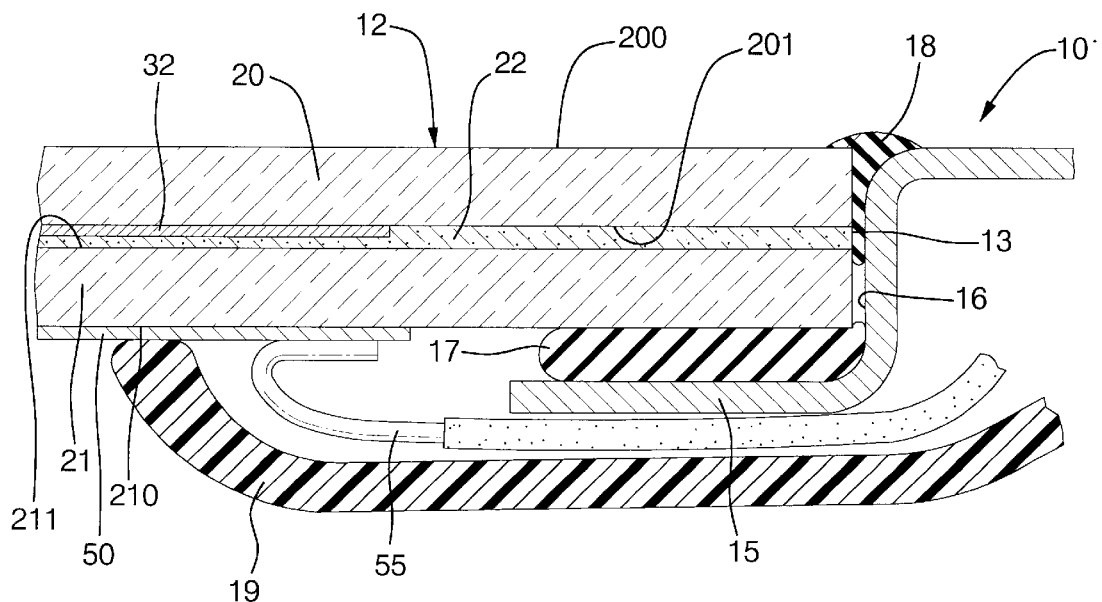
FIG. 3 shows a section view along lines 3—3 in FIG. 1.
Figure 4:
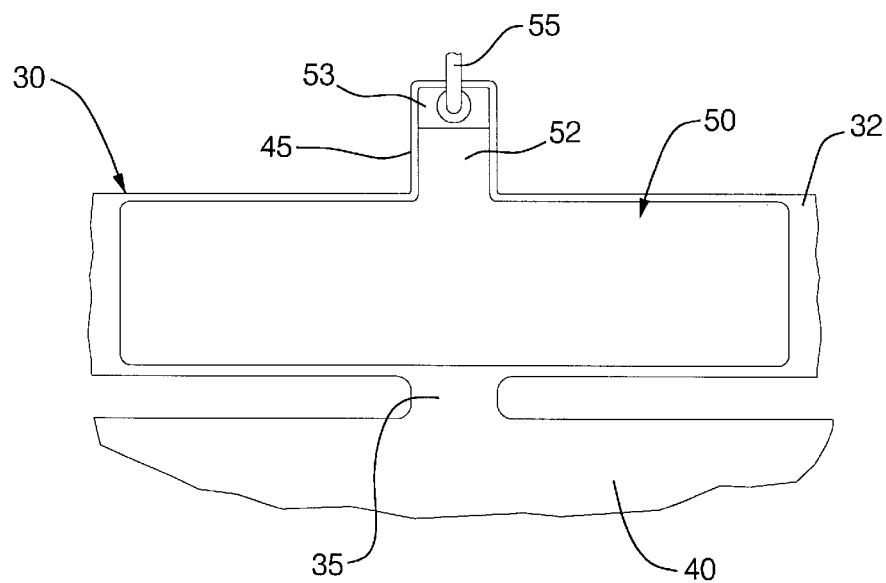
FIG. 4 is an enlarged view of a preferred embodiment of capacitive coupling apparatus for use in the window antenna of FIG. 1.

In this invention, a connection to a radio receiver is established without physical contact to the antenna itself within window glass 12. The connection apparatus comprises a capacitive coupling member 50 affixed to outer surface 210 of inner glass sheet 21. A preferred embodiment of coupling member 50 is shown in FIG. 3 and 4. FIG. 4 is a view from inside the vehicle looking out, so that coupling member 50 is shown in front of principal element 32 of antenna 30. Coupling member 50 is an essentially transparent, electrically conducting, planar member, rectangular in shape and disposed in a plane parallel manner opposite principal element 32 to form a capacitor therewith through a dielectric medium comprising inner glass sheet 21 and interposed layer 22. In this embodiment, coupling member 50 is made of a transparent, electrically conducting film such as zinc or tin oxide: similar to that of antenna minus the infra-red reflecting layer(s). The overlapping area of principal element 32 and coupling member 50 is large: at least 100 square cm and preferably about 116 square cm. This large area is required so that the impedance of the coupling member in the commercial FM (3 meter) broadcast band will be insignificantly low so as not to adversely affect the impedance matching achieved by the parasitically coupled slot transmission line. Thus, capacitive coupling member 50 is electrically, as well as visually, transparent. Its impedance is directly proportional to the comparatively large distance separating the two elements—comprising the thickness of inner glass sheet 21 and interposed layer 22—which must be countered with a similarly large area of the opposed conductors. On the other hand, although capacitive coupling member 50 is essentially visually transparent, it is not totally invisible; and it is thus desirable to make it no larger than required. To guarantee that full use is made of its area for optimal size, coupling member 50 may be made slightly smaller in vertical width than that of principal element 32 to allow full overlap within a small range of tolerances in the placement of coupling member 50 on window glass 12.

Since coupling member 50 is external to window glass 12, it is accessible for connection via the center wire of a coaxial cable to radio frequency receiver apparatus. But, for the sake of appearance, it is desirable for this connection to be hidden. Therefore, a portion 52 of coupling member 50 is extended vertically toward the top of the window aperture and ends in a terminal member 53. Referring to FIG. 3, a vehicle trim item such as headliner 19 covers and hides the upper edge of window glass 12 in the passenger compartment of the vehicle. Headliner 19 projects typically about 3 cm beyond the upper edge of window glass 12; and terminal member 53 is closer than 3 cm to the upper edge of window glass 12 so as to be hidden by headliner 19 but is sufficiently far from the upper edge of window glass 12 to avoid contact with annular sealing member 17. The latter is important because annular sealing member 17 is made of a urethane material with embedded carbon particles to impart a black color and has a high dielectric constant. Overlapping contact between terminal member 53 and annular sealing member 17 would capacitively couple antenna 30 at radio frequencies directly to ground in the form of flange 15 of vehicle body 10 and thus degrade antenna performance. Terminal member 53, being hidden, may be made of an opaque material such as copper to support soldering or may include terminal means for otherwise connecting with wire 55—the center connector of a coaxial cable. Wire 55 may be insulated as shown or separated by an insulating member, not shown, to prevent shorting out against flange 15 of body 10.

Figure 5:
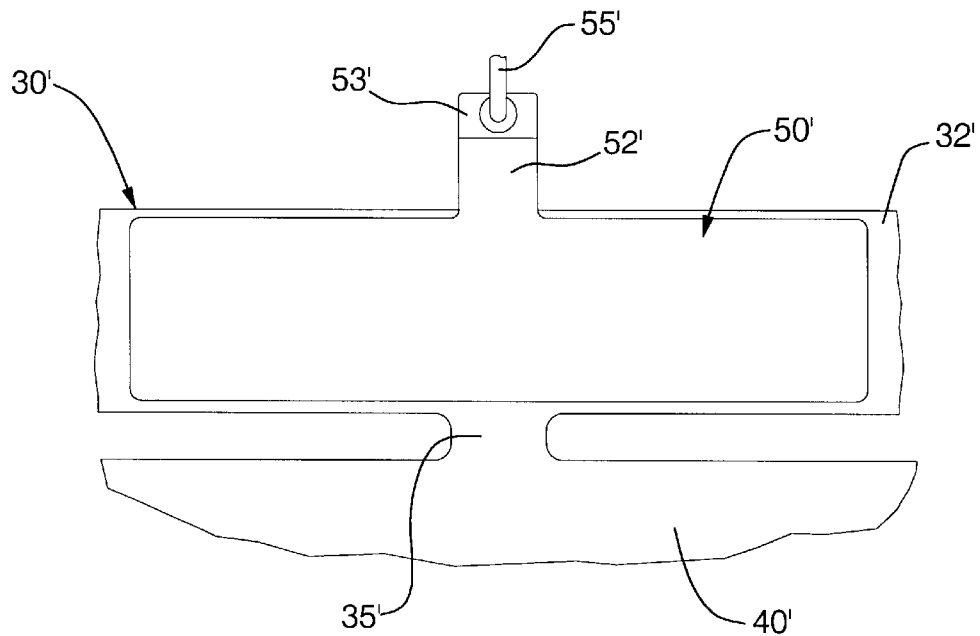
FIG. 5 and 6 are enlarged views of alternative embodiments of capacitive coupling apparatus for use in the window antenna of FIG. 1.

In this embodiment, a portion 45 of antenna 30 extends vertically behind portion 52 of coupling member 50; and such an arrangement provides additional benefits. The area of portion 52 which overlaps portion 45 is included in the total required area of coupling member 50, and this allows the horizontal length of coupling member 50 to be somewhat shorter. In addition, it assures that portion 52 of coupling member 50 will be capacitively coupled to antenna 30 and will thus not adversely affect antenna performance by acting as a separate radiator. However, if these advantages are not important, portion 45 may be eliminated, as shown in the alternate embodiment of FIG. 5 with similar but primed reference numerals. Antenna 30' differs from antenna 30 of FIG. 3 in the elimination of portion 45, and coupling member 50' differs from coupling member 50 of FIG. 3 in being slightly longer in horizontal length to make up for the loss of the coupling area of portion 52.

Figure 6:
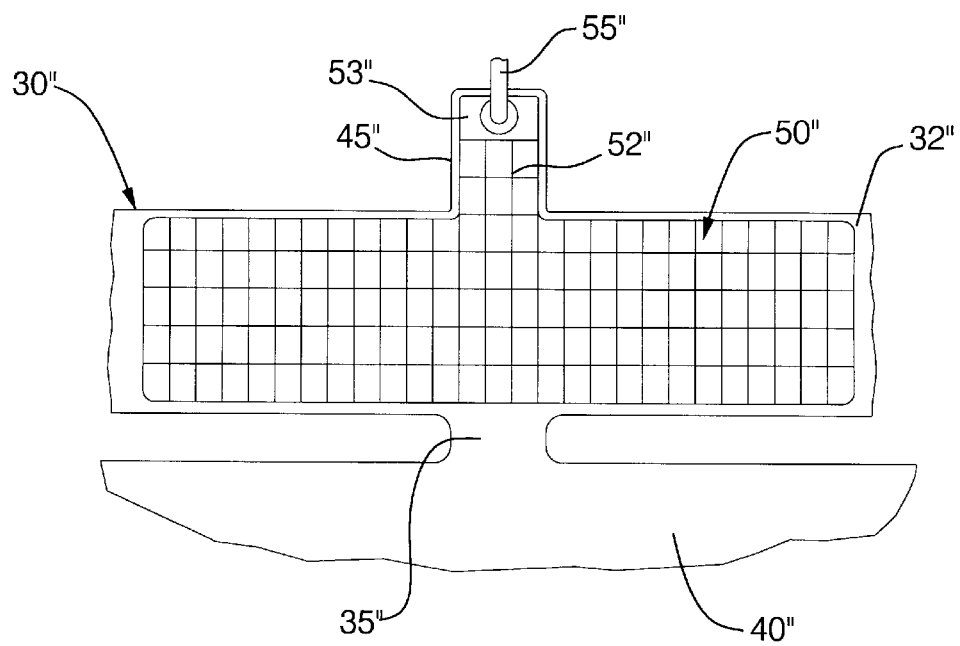

In another alternative embodiment, shown in FIG. 6, coupling member 50" comprises a grid of frit material having a sufficient number of grid elements to provide a resistance equivalent to the 4 ohms per square or less of the conductive film used in the embodiment of FIG. 3. Only terminal member 53" is solid and opaque, as in the embodiment of FIG. 3. Although the frit material itself is not transparent, the grid conductors are very thin, as in rear window defoggers made of the same material, and coupling member 50" itself is thus, as a whole, essentially transparent. With sufficient grid conductors to achieve the equivalent 4 ohm per square or less resistance, the grid will serve as a capacitor plate essentially equivalent to the solid film of the embodiment of FIG. 3.

What is claimed is:

1. Antenna connection apparatus for a vehicle having an electrically conducting structure forming a window aperture with a window glass disposed therein, the window glass comprising inner and outer glass sheets with an interposed binder layer, the aperture having an edge with a horizontal upper edge portion and a remaining edge portion, an antenna comprising a transparent, electrically conducting film between the outer glass sheet of the window glass and the binder layer, the antenna comprising a principal element spaced from the upper edge portion of the window aperture and tuned to a predetermined wavelength in a commercial FM broadcast band and an impedance matching element extending downward from the principal element and spaced from the remaining edge portion of the window aperture so as to form a slot transmission line therewith parasitically coupled to the principal element and tuned to match the impedance of the antenna in the commercial FM broadcast band to a coupling cable, the antenna also having a large capacitance producing high gain in a commercial AM broadcast band, the antenna connection apparatus comprising:

an essentially transparent planar capacitive coupling member made of an electrically conducting material and affixed on an outer surface of the inner window glass, the capacitive coupling member defining a planar area parallel with and opposing an equivalent planar area of the principal element of the antenna to capacitively couple therewith through the inner glass sheet and binder layer, the planar area being sufficiently large to provide no significant impedance to signals at the predetermined wavelength in the commercial FM band, and an electrically conducting terminal member extending vertically from the capacitive coupling member near the upper edge of the aperture on an area of the window glass hidden by vehicle trim.

2. The antenna of claim 1 in which the planar area of the capacitive coupling member is at least 100 square centimeters.

3. The connection apparatus of claim 1 in which the capacitive coupling member comprises a sheet film of an electrically conducting metallic oxide having a sheet resistance no greater than 4 ohms per square.

4. The connection apparatus of claim 1 in which the capacitive coupling member comprises a grid of frit material having an equivalent sheet resistance no greater than 4 ohms per square.

5. The antenna connection apparatus of claim 1 in which the principal element of the antenna comprises a horizontally elongate portion having an effective horizontal length of one quarter the predetermined wavelength in the commercial FM broadcast band, the capacitive coupling member comprises a main portion directly parallel to the horizontally elongate portion of the principal element and a connection portion extending vertically from the main portion to the terminal member, and the antenna further comprises an additional portion extending vertically from the horizontally elongate portion directly parallel to the connection portion of the capacitive coupling member, the additional portion of the antenna providing additional capacitive coupling area with the capacitive coupling member and also assuring that the connection portion of the capacitive coupling member does not provide a separate radiating antenna element.

* * * * *